US009198120B2

(12) United States Patent
Liu et al.

(10) Patent No.: US 9,198,120 B2
(45) Date of Patent: Nov. 24, 2015

(54) METHOD AND APPARATUS FOR SCANNING MULTIPLE CHANNELS IN A WIRELESS NETWORK

(71) Applicant: Marvell World Trade Ltd., St. Michael (BB)

(72) Inventors: Yong Liu, Campbell, CA (US); Raja Banerjea, Sunnyvale, CA (US)

(73) Assignee: Marvell World Trade LTD., St. Michael (BB)

( * ) Notice: Subject to any disclaimer, the term of this patent is extended or adjusted under 35 U.S.C. 154(b) by 219 days.

(21) Appl. No.: 13/858,662

(22) Filed: Apr. 8, 2013

(65) Prior Publication Data

US 2013/0286937 A1    Oct. 31, 2013

Related U.S. Application Data

(60) Provisional application No. 61/639,245, filed on Apr. 27, 2012, provisional application No. 61/792,405, filed on Mar. 15, 2013.

(51) Int. Cl.
*H04W 48/16* (2009.01)
*H04W 88/06* (2009.01)
*H04W 24/10* (2009.01)
*H04W 8/00* (2009.01)

(52) U.S. Cl.
CPC .............. *H04W 48/16* (2013.01); *H04W 8/005* (2013.01); *H04W 24/10* (2013.01); *H04W 88/06* (2013.01)

(58) Field of Classification Search
CPC .................................................... H04W 48/16
USPC .................................. 370/252, 281, 328, 329
See application file for complete search history.

(56) References Cited

U.S. PATENT DOCUMENTS

| 5,603,081 | A  | * | 2/1997  | Raith et al. ................. 455/435.3 |
| 7,304,939 | B2 | * | 12/2007 | Steer et al. .................... 370/208 |
| 7,593,375 | B2 | * | 9/2009  | Seo et al. ....................... 370/338 |
| 7,859,986 | B2 | * | 12/2010 | Laroia et al. .................. 370/208 |

(Continued)

FOREIGN PATENT DOCUMENTS

WO    WO-2011106538 A1    9/2011

OTHER PUBLICATIONS

"Specification of the Bluetooth System" Master Table of Contents & Compliance Requirments-Covered Core Package version: 4.0; Jun. 30, 2010; 2302 Pages.

(Continued)

*Primary Examiner* — Andrew Lai
*Assistant Examiner* — Andrew C Lee (57) ABSTRACT

A client station including a transceiver module, a scanning module, and an association module. The transceiver module is configured to transmit and receive data via a frequency band, where the frequency band includes a plurality of channels. The scanning module is configured to simultaneously scan multiple channels of the frequency band at the same time instead of scanning the plurality of channels of the frequency band one channel at a time, and to determine whether one or more access points are available for association in one or more of the multiple channels. The association module is configured to, in response to the scanning module determining that one or more access points are available for association, determine whether to associate with one of the one or more access points determined to be available for association.

26 Claims, 7 Drawing Sheets

(56) References Cited

U.S. PATENT DOCUMENTS

| | | | |
|---|---|---|---|
| 8,014,446 B2* | 9/2011 | Shah et al. | 375/240.01 |
| 2004/0192279 A1* | 9/2004 | Backes et al. | 455/418 |
| 2005/0096053 A1* | 5/2005 | Liu et al. | 455/439 |
| 2005/0232208 A1* | 10/2005 | Hansen | 370/338 |
| 2006/0007888 A1* | 1/2006 | Lee et al. | 370/330 |
| 2006/0146834 A1* | 7/2006 | Baker et al. | 370/395.53 |
| 2006/0189311 A1* | 8/2006 | Cromer et al. | 455/434 |
| 2006/0203784 A1 | 9/2006 | Cromer et al. | |
| 2007/0124478 A1* | 5/2007 | Abdelhamid et al. | 709/227 |
| 2007/0182855 A1* | 8/2007 | Nadarajah | 348/565 |
| 2007/0237118 A1* | 10/2007 | Seo | 370/335 |
| 2008/0014934 A1* | 1/2008 | Balasubramanian et al. | 455/434 |
| 2008/0170539 A1* | 7/2008 | Hyon et al. | 370/328 |
| 2008/0240271 A1* | 10/2008 | Berens | 375/260 |
| 2008/0285515 A1* | 11/2008 | Sim et al. | 370/329 |
| 2009/0129324 A1* | 5/2009 | Soneda | 370/329 |
| 2009/0247085 A1* | 10/2009 | Misumi | 455/63.3 |
| 2009/0290552 A1* | 11/2009 | Bertorelle | 370/329 |
| 2009/0310563 A1* | 12/2009 | Chou et al. | 370/331 |
| 2010/0097952 A1* | 4/2010 | McHenry et al. | 370/252 |
| 2010/0303033 A1* | 12/2010 | Shahar et al. | 370/329 |
| 2010/0303183 A1* | 12/2010 | Desai | 375/350 |
| 2011/0096739 A1* | 4/2011 | Heidari et al. | 370/329 |
| 2011/0117911 A1* | 5/2011 | Narang et al. | 455/434 |
| 2012/0052900 A1 | 3/2012 | Liu et al. | |
| 2012/0063410 A1* | 3/2012 | Hong et al. | 370/330 |
| 2012/0087323 A1* | 4/2012 | Feng et al. | 370/329 |
| 2013/0005280 A1* | 1/2013 | Leung et al. | 455/90.1 |
| 2013/0016760 A1* | 1/2013 | Shellhammer et al. | 375/146 |
| 2013/0033995 A1* | 2/2013 | Kraglund et al. | 370/252 |
| 2013/0039181 A1* | 2/2013 | Chao | 370/235 |

OTHER PUBLICATIONS

IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.

IEEE 802.20-2008 "IEEE Standard for Local and metropolitan area networks: Part 20: Air Interface for Mobile Broadband Wireless Access Systems Supporting Vehicular Mobility-Physical and Media Access Control Layer Specification" IEEE Computer Society; Aug. 29, 2008; 1053 Pages.

IEEE P802.11, Wireless LANs, Mar. 2012, 2793 pages.

IEEE P802.11ac/D2.1 "Draft Standard for Information Technology—Telecommunications and information exchange between systems—Local and metropolitan area networks—Specific requirements; Part 11: Wireless LAN Medium Access Control (MAC) and Physical Layer (PHY) specifications: Amendment 4: Enhancements for Very High Throughput for Operation in Bands below 6 GHz" 2012; 363 Pages.

IEEE P802.11ad/D5.0 Draft Standard for Information Technology—Telecommunications and Information Exchange Between Systems—Local and Metropolitan area networks—Specific Requirements; Part 11: Wireless LAN Medium Access Control (MAC) and Physical Layer (PHY) Specifications; Amendment 3: Enhancements for Very High Throughput in the 60 GHz Band; Sep. 2011; 601 Pages.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: Hiqh-Speed Physical Laver in the 5 GHZ Band," *The Institute of Electrical and Electronics Engineers, Inc.*, (1999).

IEEE Std 802.11b-1999/Cor 1-2001 (Corrigendum to IEEE Std 802.11 b-1999) "IEEE Standard for Information technology—Telecommunications and information exchange between systems—Local and metropolitan area networks—Specific requirements, Part11: Wireless LAN Medium Access Control (MAC) and Physical Layer (PHY) specifications, Amendment 2: Higher-speed Physical Layer (PHY) extension in the 2.4 GHz band-Corrigendum 1 ," *The Institute of Electrical and Electronics Engineers, Inc.*, Nov. 7, 2001.

IEEE Std. 802.11n "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

IEEEP802.11ah—Minyoung, Park;Wireless LANs Proposed Specification Framework for TGah; Mar. 12, 2012; 13 Pages.

International Preliminary Report on Patentability for Application No. PCT/US2013/036315 filed Apr. 12, 2013; dated Oct. 28, 2014; 11 Pages.

International Search Report for Application No. PCT/US2013/036315 filed Apr. 12, 2013; dated Oct. 28, 2014; 9 Pages.

* cited by examiner

METHOD AND APPARATUS FOR SCANNING MULTIPLE CHANNELS IN A WIRELESS NETWORK

CROSS-REFERENCE TO RELATED APPLICATIONS

This application claims the benefit of U.S. Provisional Application No. 61/639,245, filed on Apr. 27, 2012 and U.S. Provisional Application No. 61/792,405, filed on Mar. 15, 2013. The entire disclosures of the applications referenced above are incorporated herein by reference.

FIELD

The present disclosure relates generally to wireless networks and more particularly to scanning multiple channels in a wireless network.

BACKGROUND

The Institute of Electrical and Electronics Engineers (IEEE) has promulgated several communication standards. One of these standards is an IEEE 802.11-2012 standard. Prior to joining a WiFi network or a network compliant with the IEEE 802.11-2012 standard, a client station needs to discover one or more available access points in the neighborhood. After discovering one or more available access points, the client station can choose to associate with one of the discovered access points.

To discover an access point, the client station scans the channels in a band in which the client station operates (e.g., a 2.4 GHz band and/or a 5 GHz band). The client station can scan the channels in two ways. One way of scanning the channels is called active scanning, and another is called passive scanning. In active scanning, the client station transmits a probe request to elicit a probe response from one or more access points. In passive scanning, the client station scans the channels for beacons transmitted by one or more access points.

SUMMARY

A client station comprises a transceiver module, a scanning module, and an association module. The transceiver module is configured to transmit and receive data via a frequency band, where the frequency band includes a plurality of channels. The scanning module is configured to simultaneously scan multiple channels of the frequency band at the same time instead of scanning the plurality of channels of the frequency band one channel at a time, and to determine whether one or more access points are available for association in one or more of the multiple channels. The association module is configured to, in response to the scanning module determining that one or more access points are available for association, determine whether to associate with one of the one or more access points determined to be available for association.

In other features, the scanning module is configured to determine whether one or more access points are available for association in one or more of the multiple channels by detecting whether one or more beacons are received from the one or more access points via one or more of the multiple channels.

In other features, the scanning module is configured to scan the multiple channels and determine whether one or more access points are available for association in one or more of the multiple channels by (i) transmitting a probe request via each of the multiple channels, and (ii) detecting whether one or more responses to the probe request are received from the one or more access points via one or more of the multiple channels.

In other features, the scanning module includes a preamble detection module configured to detect whether a preamble of a frame is received via a first channel of the multiple channels, and a decoding module configured to attempt to decode a signal field of the frame in response to the preamble detection module detecting that the preamble of the frame is received via the first channel of the multiple channels, where the signal field follows the preamble.

In other features, the decoding module is configured to determine, based on decoding the signal field, whether the frame is (i) a beacon or (ii) a probe response to a probe request; and to decode, in response to the frame being (i) the beacon or (ii) the probe response to the probe request, a remaining portion of the frame to determine whether to associate with one of the access points that transmitted the beacon or the response to the probe request.

In other features, the decoding module is configured to stop decoding the signal field in response to the decoding module being unable to decode the signal field, or in response to the decoding module determining, based on the decoding of the signal field, that the frame is neither a beacon nor a probe response to a probe request. The preamble detection module is configured to, in response to the decoding module stopping the decoding of the signal field, begin detecting whether a second preamble of a second frame is received via a second channel of the multiple channels.

In other features, the preamble detection module is configured to detect, while the decoding module is attempting to decode the signal field of the frame received via the first channel of the multiple channels, whether a second preamble of a second frame is received via a second channel of the multiple channels.

In other features, in response to the preamble detection module detecting that the second preamble of the second frame is received via the second channel of the multiple channels, and subsequent to the decoding module having decoded the signal field of the frame received via the first channel of the multiple channels, the scanning module is configured to simultaneously scan the multiple channels for a beacon interval to detect whether a beacon is received on the second channel of the multiple channels; or transmit a probe request on the second channel of the multiple channels to elicit a probe response to the probe request.

In other features, in response to the preamble detection module detecting that the second preamble of the second frame is received via the second channel of the multiple channels, and subsequent to the decoding module having decoded the signal field of the frame received via the first channel of the multiple channels, the scanning module is configured to wait until (i) a probe response or (ii) a beacon is detected on the second channel of the multiple channels; transmit a probe request on the second channel of the multiple channels; or transmit a probe request on the multiple channels.

In other features, the scanning module includes a preamble detection module configured to detect whether a preamble of a frame is received via one of the multiple channels; and a decoding module configured to, in response to the preamble detection module detecting that the preamble of the frame is received via one of the multiple channels, decode the preamble or a signal field following the preamble, and determine, based on the decoding of the preamble or the signal field, whether the preamble or the signal field includes an indication that the frame is (i) a beacon, (ii) a probe response, or (ii) transmitted by one of the access points.

In other features, the decoding module is configured to decode, in response to the frame being (i) the beacon or (ii) the probe response, a remaining portion of the frame to determine whether to associate with one of the access points that transmitted the beacon or the probe response.

In other features, the decoding module is configured to stop decoding the frame in response to the decoding module having determined, based on the decoding of the preamble or the signal field, that the frame is neither the beacon nor the probe response. The preamble detection module is configured to, in response to the decoding module having stopped the decoding of the frame, begin detecting whether the preamble of the frame is received via others of the multiple channels.

In other features, in response to the decoding module determining that the frame is transmitted by one of the access points, the scanning module is configured to send a probe request on the one of the multiple channels.

In other features, the scanning module is configured to transmit a probe request via each of the multiple channels. In response to the scanning module having detected that multiple responses to the probe request have been received from more than one of the access points via more than one of the multiple channels, the scanning module includes a decoding module configured to attempt to decode a first response of the multiple responses, where the first response is received via a first channel of the multiple channels; and a preamble detection module configured to detect, while the decoding module is decoding the first response received via the first channel, whether a preamble of a frame is received via a second channel of the multiple channels. The scanning module is configured to, in response to the preamble detection module having detected that the preamble of the frame is received via the second channel, retransmit the probe request via the second channel.

In other features, the scanning module includes a preamble detection module configured to detect whether a preamble of a frame is received via any of the multiple channels, and a decoding module configured to decode a signal field of the frame in response to the preamble detection module having detected that the preamble of the frame has been received via a predetermined channel of the multiple channels, where the signal field follows the preamble.

In other features, in response to the preamble detection module having detected that the preamble of the frame has been received via the predetermined channel, the decoding module is configured to determine, based on having decoded the signal field, whether the frame is (i) a beacon or (ii) a probe response to a probe request; and decode, in response to the frame being (i) the beacon or (ii) the response to the probe request, a remaining portion of the frame to determine whether to associate with one of the access points that transmitted the beacon or the probe response.

In other features, in response to the preamble detection module detecting that the preamble of the frame is received via one or more channels of the multiple channels different than the predetermined channel, the decoding module is configured to select one of the one or more channels as the predetermined channel.

In other features, the scanning module is configured to prior to selecting one of the one or more channels as the predetermined channel, scan the multiple channels by detecting whether one or more beacons are received from the one or more access points via one or more of the multiple channels; and subsequent to selecting one of the one or more channels as the predetermined channel, scan the selected predetermined channel by (i) transmitting a probe request via the selected predetermined channel, and (ii) detecting whether a probe response is received from the one or more access points via the selected predetermined channel.

In other features, the frequency band is a 2.4 GHz band, and the transceiver module is configured to transmit and receive data via a single 20 MHz channel in the 2.4 GHz band.

In other features, the frequency band is a 5 GHz band, and the transceiver module is configured to transmit and receive data via a plurality of contiguous 20 MHz channels in the 5 GHz band.

In still other features, a method comprises transmitting and receiving data via a frequency band at a client station, where the frequency band includes a plurality of channels; simultaneously scanning multiple channels of the frequency band at the same time instead of scanning the plurality of channels of the frequency band one channel at a time; determining whether one or more access points are available for association in one or more of the multiple channels; and in response to determining that one or more access points are available for association, determining whether to associate with one of the one or more access points determined to be available for association.

In other features, the method further comprises determining whether one or more access points are available for association in one or more of the multiple channels by detecting whether one or more beacons are received from the one or more access points via one or more of the multiple channels; or scanning the multiple channels and determining whether one or more access points are available for association in one or more of the multiple channels by (i) transmitting a probe request via each of the multiple channels, and (ii) detecting whether one or more responses to the probe request are received from the one or more access points via one or more of the multiple channels.

In other features, the method further comprises detecting whether a preamble of a frame is received via a first channel of the multiple channels; attempting to decode a signal field of the frame in response to detecting that the preamble of the frame is received via the first channel of the multiple channels, where the signal field follows the preamble; and (a) determining, based on decoding the signal field, whether the frame is (i) a beacon or (ii) a probe response; and decoding, in response to the frame being (i) the beacon or (ii) the probe response, a remaining portion of the frame to determine whether to associate with one of the access points that transmitted the beacon or the probe response; or (b) stopping decoding the signal field in response to (i) being unable to decode the signal field, or (ii) determining, based on the decoding of the signal field, that the frame is neither the beacon nor the probe response; and in response to stopping the decoding of the signal field, beginning detecting whether a second preamble of a second frame is received via a second channel of the multiple channels.

In other features, the method further comprises detecting whether a preamble of a frame is received via a first channel of the multiple channels; attempting to decode a signal field of the frame in response to detecting that the preamble of the frame is received via the first channel of the multiple channels, where the signal field follows the preamble; and detecting, while attempting to decode the signal field of the frame received via the first channel of the multiple channels, whether a second preamble of a second frame is received via a second channel of the multiple channels.

In other features, in response to detecting that the second preamble of the second frame is received via the second channel of the multiple channels, and subsequent to having decoded the signal field of the frame received via the first channel of the multiple channels, the method further comprises (a) (i) simultaneously scanning the multiple channels for a beacon interval to detect whether a beacon is received on the second channel of the multiple channels, or (ii) transmitting a probe request on the second channel of the multiple channels to elicit a probe response to the probe request; or (b) (i) waiting until a probe response or a beacon is detected on the second channel of the multiple channels, (ii) transmitting a probe request on the second channel of the multiple channels, or (iii) transmitting a probe request on the multiple channels.

In other features, the method further comprises detecting whether a preamble of a frame is received via one of the multiple channels; and in response to detecting that the preamble of the frame is received via one of the multiple channels, decoding the preamble or a signal field following the preamble, and determining, based on the decoding of the preamble or the signal field, whether the preamble or the signal field includes an indication that the frame is (i) a beacon, (ii) a probe response, or (ii) transmitted by one of the access points.

In other features, the method further comprises (a) decoding, in response to the frame being (i) the beacon or (ii) the probe response, a remaining portion of the frame to determine whether to associate with one of the access points that transmitted the beacon or the probe response; (b) stopping decoding the frame in response to having determined, based on the decoding of the preamble or the signal field, that the frame is neither the beacon nor the probe response; and in response to having stopped the decoding of the frame, beginning detecting whether the preamble of the frame is received via others of the multiple channels; or (c) in response to determining that the frame is transmitted by one of the access points, sending a probe request on the one of the multiple channels.

In other features, the method further comprises transmitting a probe request via each of the multiple channels; and in response to having detected that multiple responses to the probe request have been received from more than one of the access points via more than one of the multiple channels, attempting to decode a first response of the multiple responses, where the first response is received via a first channel of the multiple channels; detecting, while decoding the first response received via the first channel, whether a preamble of a frame is received via a second channel of the multiple channels; and in response to having detected that the preamble of the frame is received via the second channel, retransmitting the probe request via the second channel.

In other features, the method further comprises detecting whether a preamble of a frame is received via any of the multiple channels; decoding a signal field of the frame in response to having detected that the preamble of the frame has been received via a predetermined channel of the multiple channels, where the signal field follows the preamble; and in response to having detected that the preamble of the frame has been received via the predetermined channel, (a) determining, based on having decoded the signal field, whether the frame is (i) a beacon or (ii) a probe response; and (b) decoding, in response to the frame being (i) the beacon or (ii) the probe response, a remaining portion of the frame to determine whether to associate with one of the access points that transmitted the beacon or the probe response.

In other features, the method further comprises detecting whether a preamble of a frame is received via any of the multiple channels; decoding a signal field of the frame in response to having detected that the preamble of the frame has been received via a predetermined channel of the multiple channels, where the signal field follows the preamble; and in response to detecting that the preamble of the frame is received via one or more channels of the multiple channels different than the predetermined channel, selecting one of the one or more channels as the predetermined channel; prior to selecting one of the one or more channels as the predetermined channel, scanning the multiple channels by detecting whether one or more beacons are received from the one or more access points via one or more of the multiple channels; and subsequent to selecting one of the one or more channels as the predetermined channel, scanning the selected predetermined channel by (i) transmitting a probe request via the selected predetermined channel, and (ii) detecting whether a probe response is received from the one or more access points via the selected predetermined channel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A network can include IEEE 802.11b-only or IEEE 802.11a-only access points and client stations. Accordingly, beacons, probe requests, and probe responses are typically transmitted using an IEEE 802.11b mode in the 2.4 GHz band and using an IEEE 802.11a mode in the 5 GHz band to accommodate legacy IEEE 802.11b/IEEE 802.11a access points and client stations.

A band in which a client station operates may include multiple channels. Accordingly, the client station may have to conduct active or passive scanning in all channels that can be or that are likely to be used by one or more access points to transmit beacons. For example, if the client station operates in the 2.4 GHz band, the client station typically scans channels 1, 6, 11, and 12 for beacons/probe responses from one or more access points. If the client station operates in the 5 GHz band, the number of channels that need to be scanned is significantly greater than in the 2.4 GHz band since the 5 GHz band includes many 20 MHz channels that can be used by an access point to start a basic service set. Further, to avoid interference, a smart access point tends to select a different channel than the channels used by adjacent access points. Accordingly, the client station operating in the 5 GHz band sequentially scans all the channels in the 5 GHz band one channel at a time.

Figure 1:
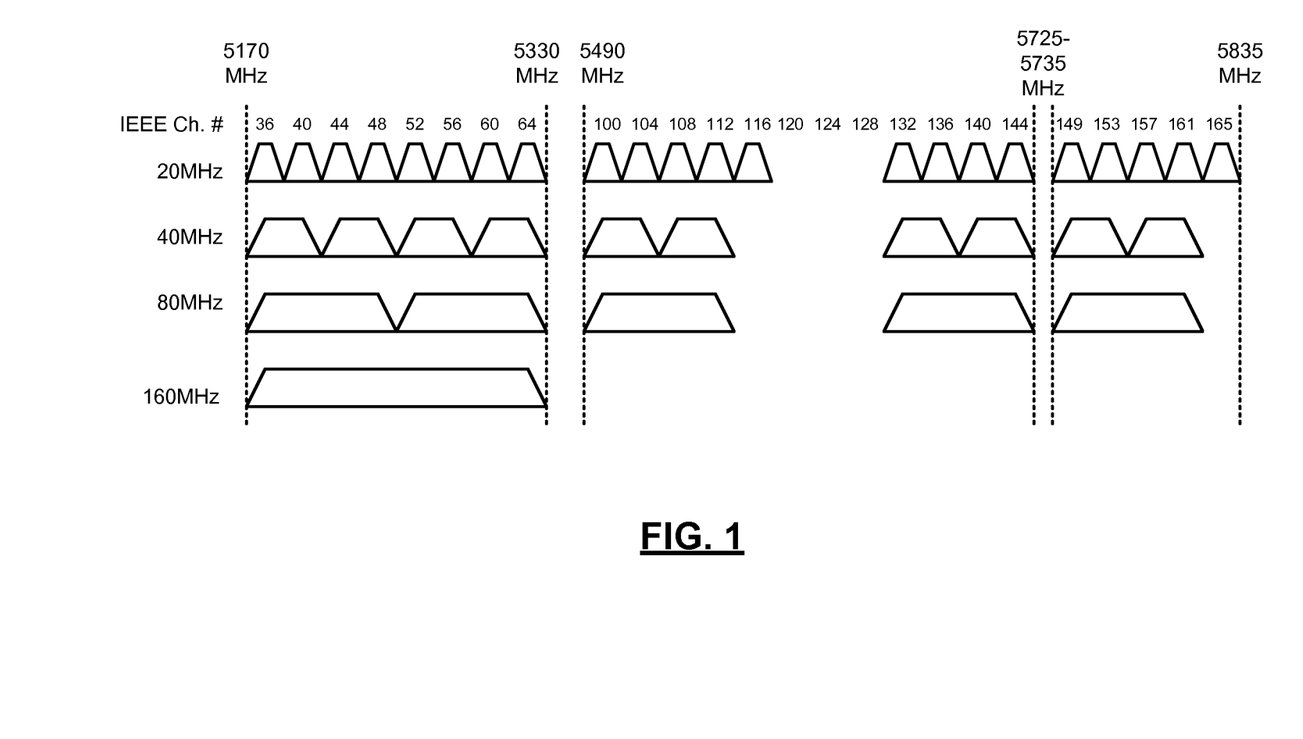
FIG. 1 shows channels of a 5 GHz band.

FIG. 1 shows channelization in the 5 GHz band. As FIG. 1 shows, the 5 GHz band includes twenty-two 20 MHz channels. Sequentially scanning all the channels in the 5 GHz band consumes a large amount of time and power. For example, if the client station spends 200 ms to scan each channel, the client station would need at least 200*22=4400 ms=4.4 s to scan all 20 MHz channels in the 5 GHz band.

The present disclosure relates to simultaneously scanning multiple channels at a time instead of scanning channels one channel at a time. Specifically, a wide-bandwidth capable client station (e.g., a client station compliant with IEEE 802.11n and/or 802.11ac standard) can simultaneously scan multiple channels for beacon and/or probe response frames in a band (e.g., a 5 GHz band) at the same time to reduce scanning time for multiple channels.

The present disclosure is organized as follows. Initially, various ways of scanning multiple channels according to various embodiments of the present disclosure are briefly described. Subsequently, a client station that scans multiple channels according to an embodiment of the present disclosure is described in detail. Thereafter, a method for scanning multiple channels according to various embodiments of the present disclosure is described.

Prior to a client station associating with an access point, the client station typically does not differentiate between various channels as being primary channels and/or secondary channels. Instead, the client station treats all the channels in the band equally, which facilitates scanning multiple channels at the same time. The client station can scan the channels in the band using passive scanning, active scanning, or a combination of passive scanning and active scanning.

In passive scanning, a wide-band client station can operate in a 40/80/160 MHz receive mode to sense beacons in any of the 20 MHz channels in the band. In active scanning, a wide-band client station can transmit probe requests in a non-high-throughput (non-HT) duplicate mode (explained below) in 40/80/160 MHz bandwidth. The client station then operates in the 40/80/160 MHz receive mode to sense probe response frames in any of the 20 MHz channels. That is, the client station can transmit probe requests on multiple 20 MHz channels within the 40/80/160 MHz bandwidth and can then listen for probe responses on each of the 20 MHz channels within the 40/80/160 MHz bandwidth.

The client station can transmit probe requests by setting a receive address (RA) equal to a broadcast address without eliciting any immediate response. This allows the access points to back-off before transmitting probe responses so that the client station will not simultaneously receive multiple probe responses. The client station can transmit an acknowledgment (ACK) on any 20 MHz channel on receiving a probe response.

More specifically, when operating in the wide-bandwidth receive mode, the receiver of the client station keeps tracking signals in each of the channels (e.g., each 20 MHz channel in 5 GHz band). Whenever a preamble is detected in one of the channels, the client station can begin decoding a signal field of the frame received in the channel and determine whether the received frame is a desired frame (e.g., a beacon or a probe response frame). If the signal field cannot be decoded, or if the received frame is not a desired frame, the client station stops the decoding immediately and resumes preamble/signal field detection on other channels.

While decoding the signal field in one channel, the client station may continue monitoring signals in other channels. If a second signal is detected in a second channel while decoding the first signal in the first channel, the client station may perform the following. In passive scanning, after decoding the first signal, the client station may scan all channels for at least one more beacon interval so that the client station can capture a beacon on the second channel. Alternatively, the client station may send a probe request on the second channel to elicit a probe response. In active scanning, after decoding the first signal, the client station may either wait until receiving a probe response or beacon on the second channel (or until timeout), or the client station may send a new probe request on the second channel, or send a new probe request on all the channels.

The scanning can be optimized as follows. At the scanning stage, a client station is interested in the following frames: a) beacons, probe responses, and other advertisement frames; b) frames transmitted in the non-HT mode and/or in a channel; and c) frames transmitted from an access point or a group owner. Special indication(s) can be inserted in the preamble/service field of a frame to indicate a type of the frame. The special indication(s) enable a scanning client station to perform the following. For frames of type a) and b), the client station can quickly skip undesired frames and resume scanning on other channels. For frames of type c), the client station can quickly decide if any access point is available and on which channel(s). This helps in expediting access point discovery (e.g., the client station sends probe requests only on the channels in which an access point is present).

Probe responses can collide when multiple access points send probe responses. For example, after a scanning client station transmits a probe request on multiple channels using the non-HT duplicate mode, multiple access points may transmit probe responses around the same time on different channels. The client station, however, can only decode a first detected probe response. When an access point receives a probe request frame sent using the non-HT duplicate mode (e.g., with a transmit address (TA) with multicast (MC) bit set), and the probe response transmitted by the access point does not get an ACK, the access point should retransmit the probe response more frequently than the access point would in response to normal probe request (in non-duplicate mode). When decoding a probe response frame on one channel, the client station may also monitor other channels and can send probe request again on the channels in which signal/preamble detected.

To simplify design, a receiver of the client station may be configured to scan energy/guard interval (GI)/preamble on multiple channels, but to decode the signal field only on a fixed/predetermined channel. In this configuration, the client station can first choose an initial decoding channel (which can be sequential, random, or one of the most popular channels, etc.) and then scan energy/guard interval (GI)/preamble in multiple channels (including the initial decoding channel) for WiFi signals. If a signal is detected on the initial decoding channel, the client station can proceed to decode the signal/frame. If a signal is detected on some of the other channels, the client station records these channels and selects these channels one by one as the decoding channel in subsequent scans. This multi-channel scanning and single-channel decoding operation can be used with both active scanning and passive scanning, as well as with hybrid active/passive scanning. For example, passive scanning can be used in a first-round of scanning with the initial decoding channel, and once the channels with signals are detected, active scanning can be used on these channels one-by-one to accelerate the scanning process.

Figure 2:
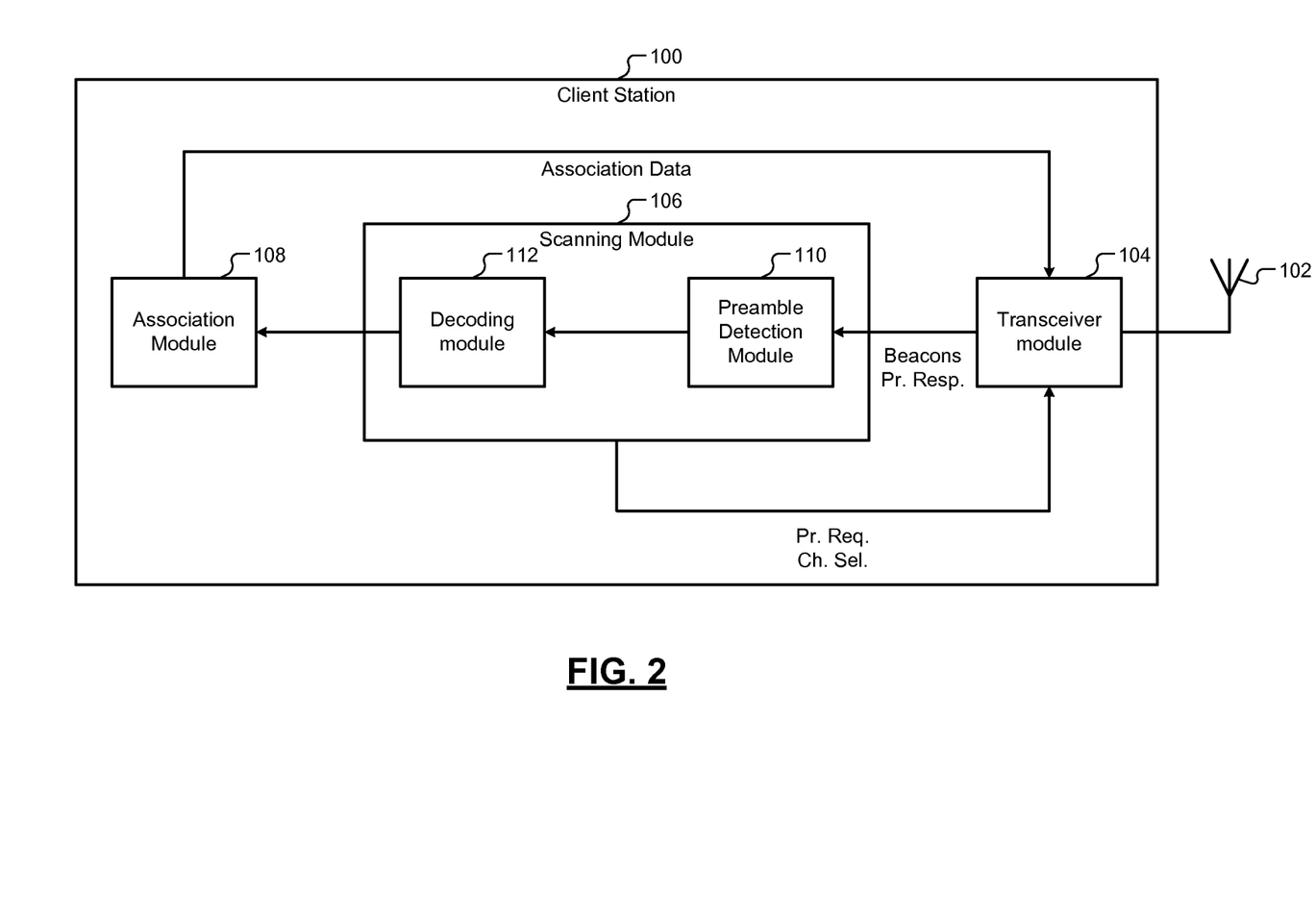
FIG. 2 is a functional block diagram of a client station that scans multiple channels according to an embodiment of the present disclosure.

FIG. 2 shows a client station 100 that scans multiple channels according to an embodiment of the present disclosure. The client station 100 includes an antenna 102, a transceiver module 104, a scanning module 106, and an association module 108. The scanning module 106 includes a preamble detection module 110 and a decoding module 112. While only one antenna 102 is shown, multiple antennas may be used.

While only one transceiver module 104 is shown, multiple transceiver modules may be collocated in the client station 100. Each transceiver module can operate in a different band. For example, a first transceiver module may operate in the 2.4 GHz band while a second transceiver module may operate in the 5 GHz band. Further, each transceiver module can operate using a different communication protocol. For example, a first transceiver module may operate using a WiFi communication protocol while a second transceiver module may operate using a Bluetooth or WiMAX communication protocol.

The client station 100 can operate in one or more frequency bands. For example, the frequency bands may include the 2.4 GHz band and/or the 5 GHz band. The transceiver module 104 can transmit and receive data via one or more frequency bands (e.g., the 2.4 GHz band and/or the 5 GHz band), where each frequency band includes a plurality of channels. The transceiver module 104 can transmit and receive data via a single 20 MHz channel in the 2.4 GHz band and/or via a plurality of 20 MHz channels in the 5 GHz band. The plurality of 20 MHz channels can be contiguous.

The scanning module 106 can simultaneously scan multiple channels of the frequency band at the same time instead of scanning the plurality of channels of the frequency band one channel at a time. Based on the scanning, the scanning module 106 can determine whether one or more access points are available for association in one or more of the multiple channels. In response to the scanning module 106 determining that one or more access points are available for association, the association module 108 can determine whether to associate with one of the available access points.

The scanning module 106 can simultaneously scan the multiple channels using passive scanning, active scanning, or both. If passive scanning is used, the scanning module 106 can determine whether one or more access points are available for association in one or more of the multiple channels by detecting whether one or more beacons are received from the one or more access points via one or more of the multiple channels. If active scanning is used, the scanning module 106 can determine whether one or more access points are available for association in one or more of the multiple channels by transmitting a probe request via each of the multiple channels, and by detecting whether one or more probe responses are received from the one or more access points via one or more of the multiple channels.

The scanning module 106 can transmit a probe request via each of the multiple channels using a non-High-throughput (non-HT) duplicate mode. The non-HT mode is used to protect legacy networks from disruption by 802.11n protocols designed to improve efficiency-protocols such as frame aggregation or space time block codes (STBC) that legacy stations are unable to interpret. In the non-HT mode, prior to using the efficiency protocols, two packets are sent on both 20 MHz halves of the 40 MHz channel simultaneously announcing a Network Allocation Vector (NAV) to tell legacy stations how long to stay off the network. The NAV is an indicator, maintained by each station, of time periods when transmission onto the wireless medium will not be initiated by the station. The NAV information can be derived from the announcements by other stations of how long they intend to occupy the medium. The NAV is the central mechanism in collision avoidance protocol.

In passive or active scanning mode, the preamble detection module 110 can detect whether a preamble of a frame is received via a first channel of the multiple channels. The decoding module 112 can attempt to decode a signal field of the frame, where the signal field follows the preamble, in response to the preamble detection module 110 detecting that a preamble of a frame is received via the first channel of the multiple channels.

The decoding module 112 can determine, based on decoding the signal field, whether the frame is a beacon or a probe response. In response to the frame being a beacon or a probe response, the decoding module 112 can decode the rest of the frame to determine whether to associate with one of the access points that transmitted the beacon or the probe response.

The decoding module 112 can stop decoding the signal field in response to the decoding module 112 being unable to decode the signal field, or determining, based on the decoding of the signal field, that the frame is neither a beacon nor a probe response. In response to the decoding module 112 stopping the decoding of the signal field, the preamble detection module 110 can begin detecting whether a preamble of a frame is received via a second channel of the multiple channels.

In some implementations, while the decoding module 112 is attempting to decode the signal field of the frame received via the first channel of the multiple channels, the preamble detection module 110 can detect whether a second preamble of a second frame is received via a second channel of the multiple channels. In response to the preamble detection module 110 detecting that the second preamble of the second frame is received via the second channel of the multiple channels, and after the decoding module 112 decodes the signal field of the frame received via the first channel of the multiple channels, the scanning module 106 can perform the following depending on whether passive or active scanning is used. If passive scanning is used, the scanning module 106 can scan the multiple channels for a beacon interval to detect whether a beacon is received on the second channel of the multiple channels. If active scanning is used, the scanning module 106 can transmit a probe request on the second channel of the multiple channels to elicit a probe response.

In some implementations, in response to the preamble detection module 110 detecting that the second preamble of the second frame is received via the second channel of the multiple channels, and after the decoding module 112 decodes the signal field of the frame received via the first channel of the multiple channels, the scanning module 106 can wait until a probe response or a beacon is detected on the second channel of the multiple channels. Alternatively, the scanning module 106 can transmit a probe request on the second channel of the multiple channels. Alternatively, the scanning module 106 can transmit a probe request on the multiple channels.

In another implementation, special indication(s) may be inserted in the preamble or the signal field of a transmitted frame to indicate a type of the frame (e.g., a beacon or a probe response). The preamble detection module 110 can detect whether a preamble of a frame is received via one of the multiple channels. In response to the preamble detection module 110 detecting that a preamble of a frame is received via one of the multiple channels, the decoding module 112 can perform the following. The decoding module 112 can decode the preamble or the signal field following the preamble. The decoding module 112 can determine, based on the decoding of the preamble or the signal field, whether the preamble or the signal field includes an indication that the frame is a beacon, a probe response, or is transmitted by one of the access points.

In response to the frame being a beacon or a probe response, the decoding module 112 can decode the rest of the frame to determine whether to associate with one of the access points that transmitted the beacon or the probe response. Alternatively, the decoding module 112 can stop decoding the frame in response to the decoding module 112 determining, based on the decoding of the preamble or the signal field, that the frame is neither a beacon nor a probe response. In response to the decoding module 112 stopping the decoding of the frame, the preamble detection module 110 can begin detecting whether a preamble of a frame is received via others of the multiple channels. In response to the decoding module 112 determining that the frame is transmitted by one of the access points, which indicates presence of an access point in the one of the multiple channels, the scanning module 106 can transmit a probe request only on the one of the multiple channels where an access point is present.

In another implementation, the scanning module 106 can transmit a probe request via each of the multiple channels, and in response to the scanning module 106 detecting that multiple probe responses are received from more than one of the access points via more than one of the multiple channels (i.e., if multiple probe responses collide), the scanning module 106 can perform the following. The decoding module 112 can attempt to decode a first probe response of the multiple probe responses, where the first probe response is received via a first channel of the multiple channels. While the decoding module 112 is decoding the first probe response received via the first channel, the preamble detection module 110 can detect whether a preamble of a frame is received via a second channel of the multiple channels. In response to the preamble detection module 110 detecting that a preamble of a frame is received via the second channel, the scanning module 106 can retransmit the probe request via the second channel.

In another implementation, the preamble detection module 110 can detect whether a preamble of a frame is received via any of the multiple channels. For example, the preamble detection module 110 may sense the multiple channels for energy, guard interval, or preamble. In response to the preamble detection module 110 detecting that a preamble of a frame is received via a predetermined channel of the multiple channels, the decoding module 112 can decode a signal field of the frame, where the signal field follows the preamble. The scanning module 106 may select the predetermined channel from the multiple channels in any manner. For example, the scanning module 106 may select the predetermined channel in a sequential or random manner or may select one of the most popular channels as the predetermined channel.

In response to the preamble detection module 110 detecting that a preamble of a frame is received via the predetermined channel, the decoding module 112 can determine, based on decoding the signal field, whether the frame is a beacon or a probe response. In response to the frame being a beacon or a probe response, the decoding module 112 can decode the rest of the frame to determine whether to associate with one of the access points that transmitted the beacon or the probe response.

The preamble detection module 110 detecting that a preamble of a frame is received via one or more channels of the multiple channels different than the predetermined channel. In response to the preamble detection module 110 detecting that a preamble of a frame is received via one or more channels of the multiple channels different than the predetermined channel, the decoding module 112 can select one of the one or more channels as the predetermined channel. Prior to selecting one of the one or more channels as the predetermined channel, the scanning module 106 can scan the multiple channels by detecting whether one or more beacons are received from the one or more access points via one or more of the multiple channels. Subsequent to selecting one of the one or more channels as the predetermined channel, the scanning module 106 can scan the selected predetermined channel by transmitting a probe request via the selected predetermined channel, and detecting whether a probe response is received from the one or more access points via the selected predetermined channel.

This scanning module 106 can use the above multi-channel scanning and single-channel decoding operation with both active scanning and passive scanning, as well as with hybrid active/passive scanning. For example, the scanning module 106 can use passive scanning in a first-round of scanning with the initial decoding channel, and once the channels with signals are detected, the scanning module 106 can use active scanning on these channels one-by-one to accelerate the scanning process.

Figure 3:
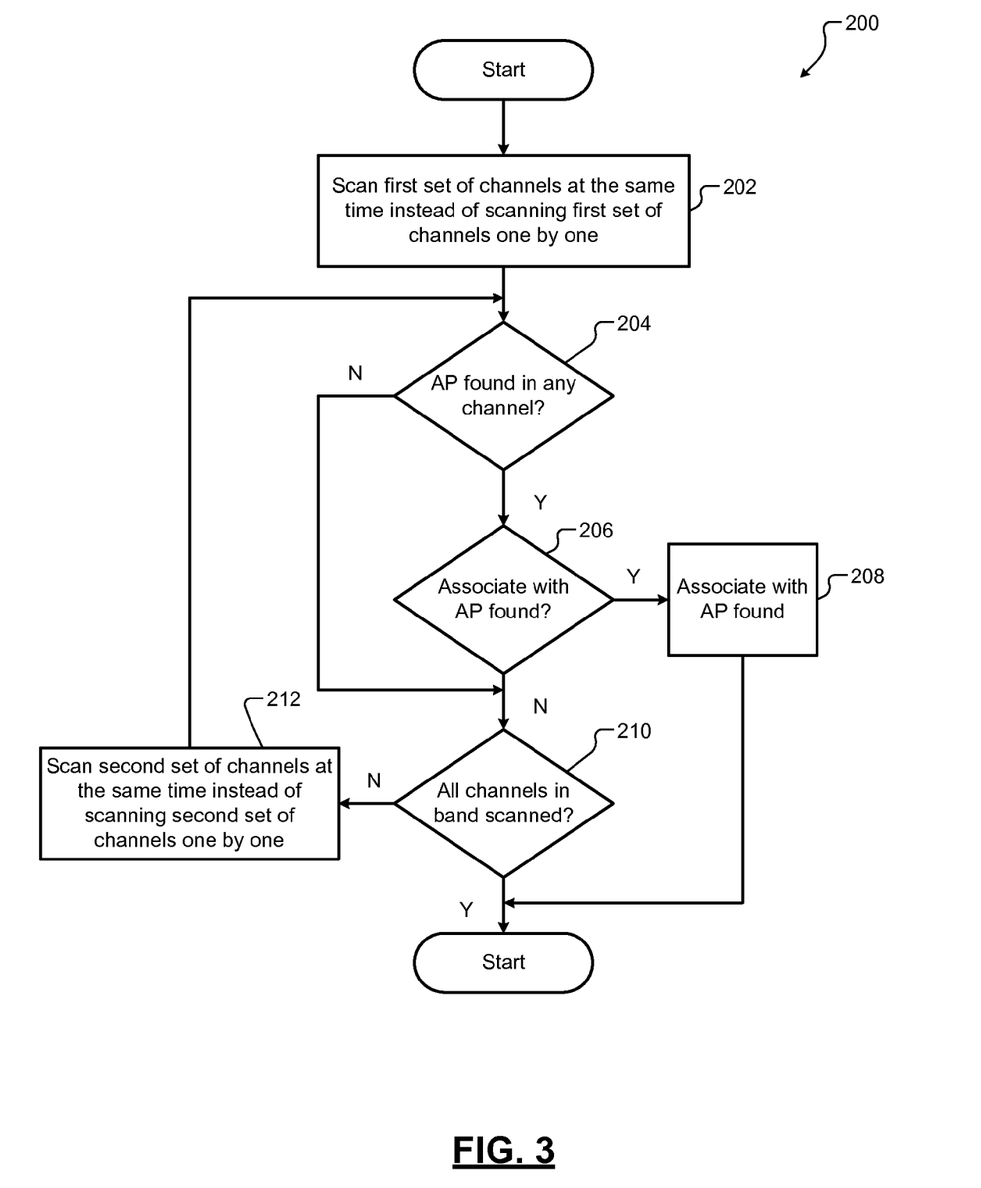
FIG. 3 is a flowchart of a method for scanning multiple channels according to an embodiment of the present disclosure.

FIG. 3 shows a flowchart of a method 200 for scanning multiple channels according to an embodiment of the present disclosure. At 202, control simultaneously scans a first set of channels at the same time for one or more access points instead of scanning the first set of channels one by one. In one implementation, the control referred to herein is implemented by the scanning module 106 shown in FIG. 2. At 204, control determines if an access point is found in any of the first set of channels. At 206, if an access point is found in any of the first set of channels, control determines whether to associate with the access point that was found. At 208, if control decides to associate with the access point that was found, control associates with the access point that was found.

At 210, if an access point is not found in any of the first set of channels at 204, control determines whether all of the channels in the band are scanned. At 212, if all of the channels in the band are not scanned, control scans a second set of channels at the same time for one or more access points instead of scanning the second set of channels one by one, and control returns to 204. The method 200 ends if all of the channels in the band are scanned.

FIGS. 4-7 show various ways in which multiple channels can be scanned according to embodiments of the present disclosure. Each of the FIGS. 4-7 shows one way of performing the scanning process described in element 202 of the method 200 shown in FIG. 2. While the various ways are shown with references to separate figures, one or more of the various ways can be combined to scan the multiple channels. In other words, the various ways are not mutually exclusive.

Figure 4:
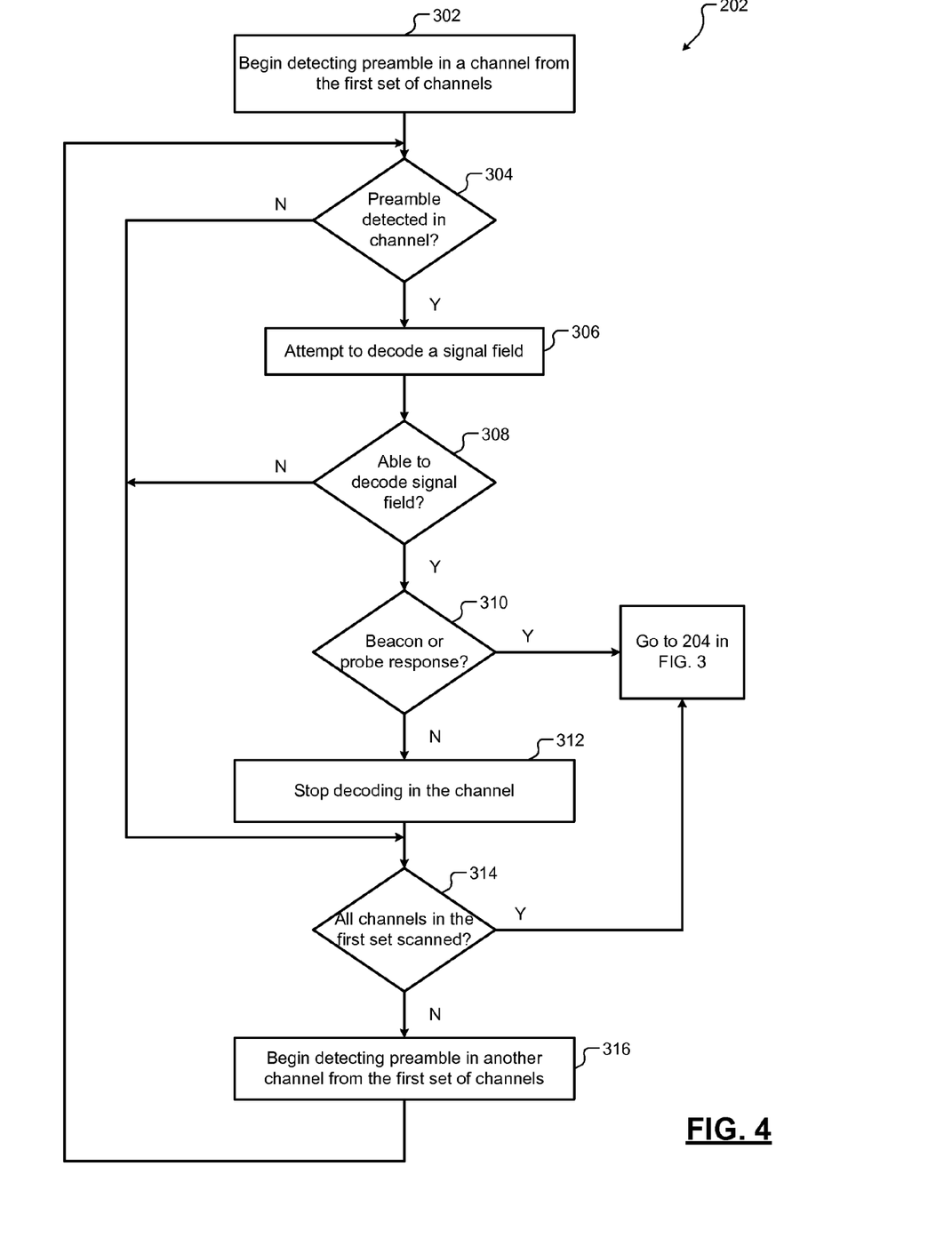
FIGS. 4-7 show various ways in which multiple channels can be scanned according to embodiments of the present disclosure.

FIG. 4 shows a first way of performing the scanning process described in element 202 of the method 200 shown in FIG. 2. At 302, control begins detecting a preamble of a frame in a channel from a first set of channels. At 304, control determines if the preamble of the frame is detected in the channel. At 306, if the preamble of the frame is detected in the channel, control attempts to decode a signal field of the frame. At 308, control determines if control is able to decode the signal field of the frame. At 310, if control is able to decode the signal field of the frame, control determines, based on the decoding of the signal field, whether the frame is a beacon or a probe response. Control returns to 204 in FIG. 3 if the frame is the beacon or the probe response.

At 312, in the frame is not the beacon on the probe response, control stops the decoding process in the channel. At the end of 312, if the preamble of the frame is not detected in the channel at 304, or if control is unable to decode the signal field of the frame at 308, at 314, control determines if all channels in the first set of channels are scanned. Control returns to 204 in FIG. 3 if all channels in the first set of channels are scanned. At 316, if all channels in the first set of channels are not scanned, control begins detecting the preamble to another channel from the first set of channels. Control returns to 304.

Figure 5:
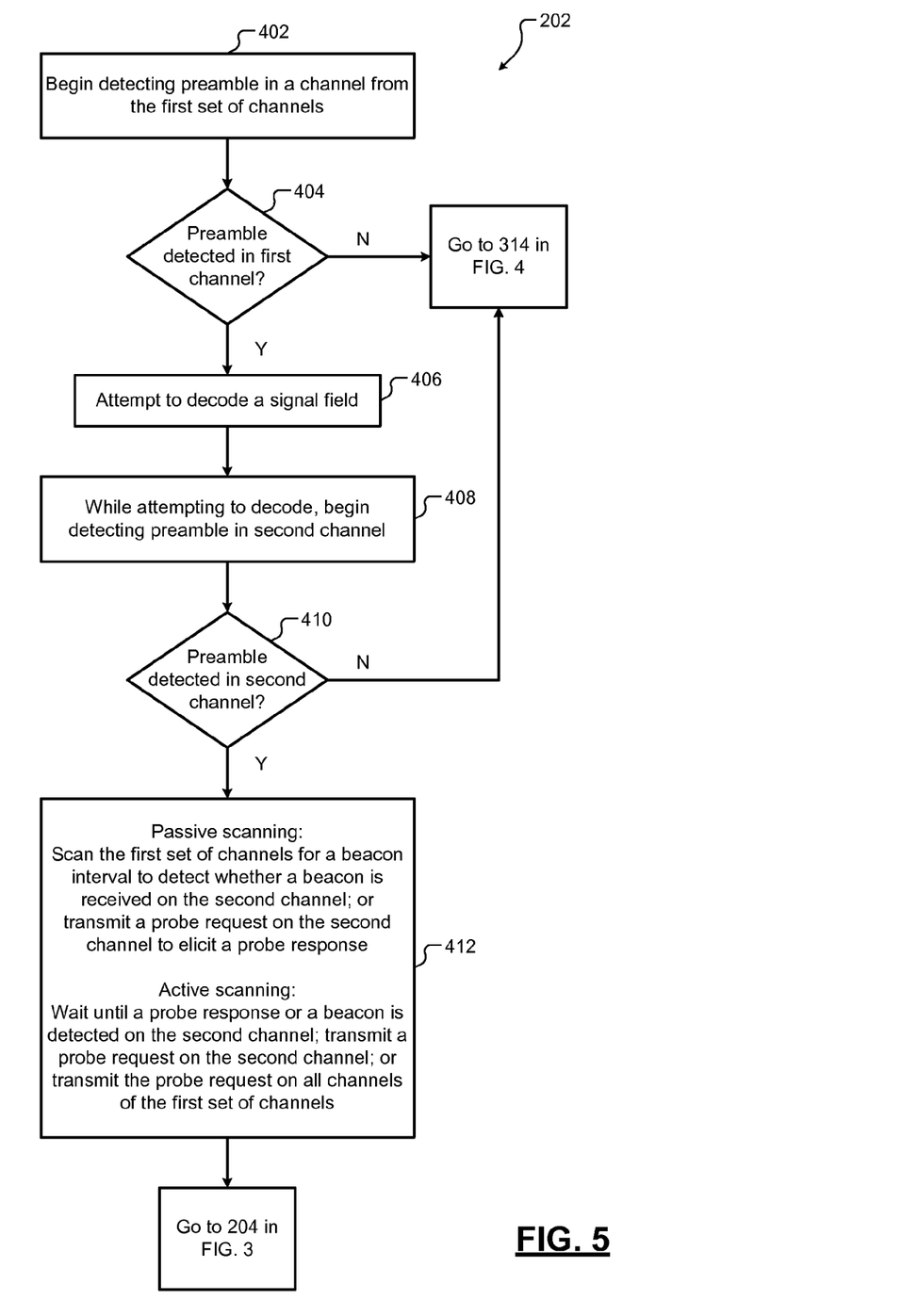

FIG. 5 shows a second way of performing the scanning process described in element 202 of the method 200 shown in FIG. 2. At 402, control begins detecting a preamble of a frame in a channel from the first set of channels. At 404, control determines if the preamble of the frame is detected in a first channel. Control returns to 314 in FIG. 4 if the preamble of the frame is not detected in the first channel.

At 406, if the preamble of the frame is detected in the first channel, control attempts to decode a single field of the frame. At 408, while attempting to decode the signal field, control begins detecting a preamble in a second channel in the first set of channels. At 410, control determines if the preamble is detected in the second channel. Control returns to 314 in FIG. 4 if the preamble of the frame is not detected in the second channel. At 412, if the preamble of the frame is detected in the second channel, control performs one or more of the following.

If passive scanning is used, control scans the first set of channels for a beacon interval to detect whether a beacon is received on the second channel, or control transmits a probe request on the second channel to elicit a probe response. If active scanning is used, control waits until the probe response or the beacon is detected on the second channel, then transmits the probe request on the second channel or transmits the probe request on all channels of the first set of channels. Control returns to 204 in FIG. 3.

Figure 6:
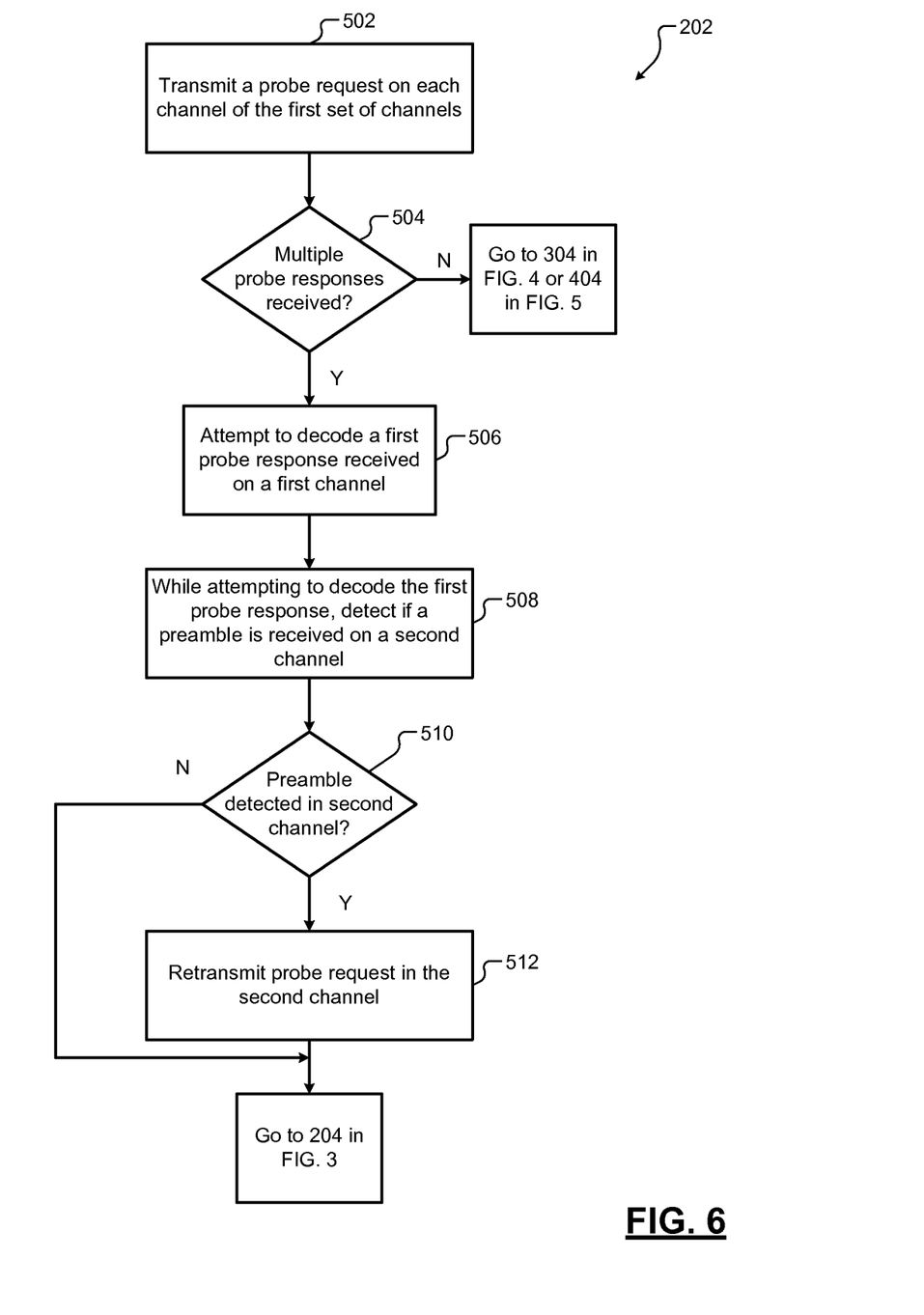

FIG. 6 shows a third way of performing the scanning process described in element 202 of the method 200 shown in FIG. 2. At 502, control transmits a probe request on each channel of the first set of channels. At 504, control determines if multiple probe responses are received in response to transferring the probe request and the channel of the first set of channels. Control returns to 304 in FIG. 4 or to 404 in FIG. 5 if no probe responses are received.

At 506, control attempts to decode a first probe response received on a first channel. At 508, while attempting to decode the first probe response, control detects if a preamble is received on a second channel. At 510, control determines if the preamble is detected in the second channel. At 512, control retransmits the probe request in the second channel if the preamble is detected in the second channel. At the end of 512, or if the preamble is not detected in the second channel, control returns to 204 and FIG. 3.

Figure 7:
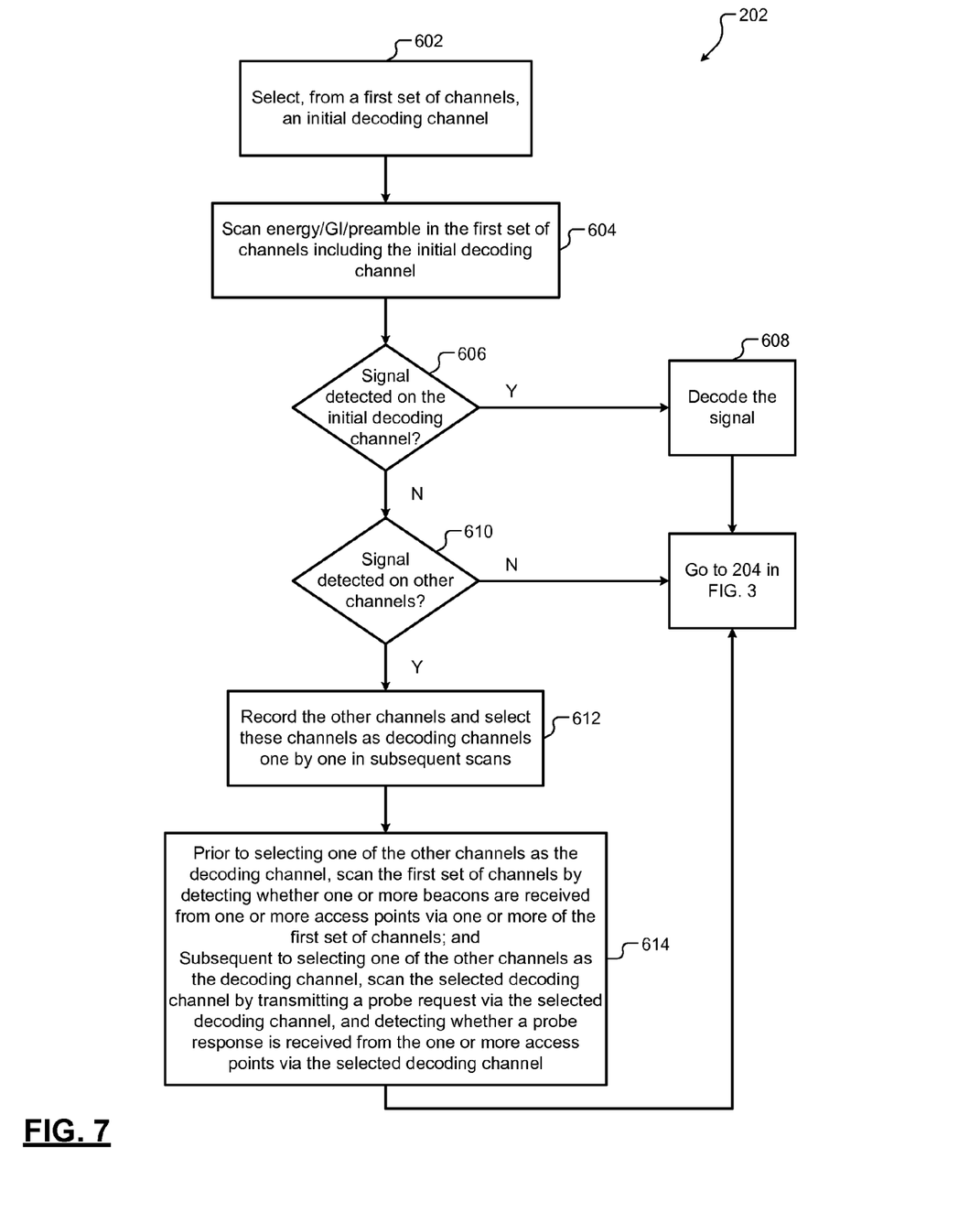

FIG. 7 shows a fourth way of performing the scanning process described in element 202 of the method 200 shown in FIG. 2. At 602, control selects, from a first set of channels, an initial decoding channel. At 604, control scans energy/GI/preamble in the first set of channels including the initial decoding channel. At 606, control determines if a signal is detected on the initial decoding channel. At 608, if the signal is not detected on the initial decoding channel, control decodes the signal, and control returns to 204 in FIG. 3. At 610, if the signal is detected on the initial decoding channel, control determines if the signal is detected on other channels. Control returns to 204 in FIG. 3 if the signal is not detected on the other channels.

At 612, if the signal is detected on other channels, control records the other channels and selects these channels as decoding channels one by one in subsequent scans. At 614, prior to selecting one of the other channels as the decoding channel, control scans the first set of channels by detecting whether one or more beacons are received from one or more access points via one or more of the first set of channels. Additionally, subsequent to selecting one of the other channels as the decoding channel, control scans the selected decoding channel by transmitting a probe request via the selected decoding channel, and detecting whether a probe response is received from the one or more access points via the selected decoding channel. Control returns to 204 in FIG. 3.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A client station comprising:
a transceiver module configured to transmit and receive data via a frequency band, wherein the frequency band includes a plurality of channels;
a scanning module configured to
simultaneously scan multiple channels of the frequency band at the same time, and
determine whether one or more access points are available for association in one or more of the multiple channels;
an association module configured to, in response to the scanning module determining that one or more access points are available for association, determine whether to associate with one of the one or more access points determined to be available for association;
a preamble detection module configured to detect whether a preamble of a frame is received via a first channel of the multiple channels; and
a decoding module configured to attempt to decode a signal field of the frame in response to the preamble detection module detecting that the preamble of the frame is received via the first channel of the multiple channels, wherein the signal field follows the preamble,
wherein the decoding module is configured to stop decoding the signal field in response to the decoding module (i) being unable to decode the signal field, or (ii) determining, based on the decoding of the signal field, that the frame is neither a beacon nor a probe response to a probe request; and
wherein the preamble detection module is configured to, in response to the decoding module stopping the decoding of the signal field, begin detecting whether a second preamble of a second frame is received via a second channel of the multiple channels.

2. A client station comprising:
a transceiver module configured to transmit and receive data via a frequency band, wherein the frequency band includes a plurality of channels;
a scanning module configured to
simultaneously scan multiple channels of the frequency band at the same time, and
determine whether one or more access points are available for association in one or more of the multiple channels;
an association module configured to, in response to the scanning module determining that one or more access points are available for association, determine whether to associate with one of the one or more access points determined to be available for association;
a preamble detection module configured to detect whether a preamble of a frame is received via a first channel of the multiple channels; and
a decoding module configured to attempt to decode a signal field of the frame in response to the preamble detection module detecting that the preamble of the frame is received via the first channel of the multiple channels, wherein the signal field follows the preamble,
wherein the preamble detection module is configured to detect, while the decoding module is attempting to decode the signal field of the frame received via the first channel of the multiple channels, whether a second preamble of a second frame is received via a second channel of the multiple channels.

3. The client station of claim 2, wherein the scanning module is configured to determine whether one or more access points are available for association in one or more of the multiple channels by detecting whether one or more beacons are received from the one or more access points via one or more of the multiple channels.

4. The client station of claim 2, wherein the scanning module is configured to scan the multiple channels and determine whether one or more access points are available for association in one or more of the multiple channels by:
(i) transmitting a probe request via each of the multiple channels, and (ii) detecting whether one or more responses to the probe request are received from the one or more access points via one or more of the multiple channels.

5. The client station of claim 2, wherein the decoding module is configured to:
determine, based on decoding the signal field, whether the frame is (i) a beacon or (ii) a probe response to a probe request; and
decode, in response to the frame being (i) the beacon or (ii) the probe response to the probe request, a remaining portion of the frame to determine whether to associate with one of the access points that transmitted the beacon or the response to the probe request.

6. The client station of claim 2, wherein in response to the preamble detection module detecting that the second preamble of the second frame is received via the second channel of the multiple channels, and subsequent to the decoding module having decoded the signal field of the frame received via the first channel of the multiple channels, the scanning module is configured to:
simultaneously scan the multiple channels for a beacon interval to detect whether a beacon is received on the second channel of the multiple channels; or
transmit a probe request on the second channel of the multiple channels to elicit a probe response to the probe request.

7. The client station of claim 2, wherein in response to the preamble detection module detecting that the second preamble of the second frame is received via the second channel of the multiple channels, and subsequent to the decoding module having decoded the signal field of the frame received via the first channel of the multiple channels, the scanning module is configured to:
wait until (i) a probe response or (ii) a beacon is detected on the second channel of the multiple channels;
transmit a probe request on the second channel of the multiple channels; or
transmit a probe request on the multiple channels.

8. The client station of claim 2, wherein the scanning module is configured to transmit a probe request via each of the multiple channels, and wherein in response to the scanning module having detected that multiple responses to the probe request have been received from more than one of the access points via more than one of the multiple channels, the scanning module includes:
a decoding module configured to attempt to decode a first response of the multiple responses, wherein the first response is received via a first channel of the multiple channels; and
a preamble detection module configured to detect, while the decoding module is decoding the first response received via the first channel, whether a preamble of a frame is received via a second channel of the multiple channels,
wherein the scanning module is configured to, in response to the preamble detection module having detected that the preamble of the frame is received via the second channel, retransmit the probe request via the second channel.

9. The client station of claim 2, wherein the scanning module includes:
a preamble detection module configured to detect whether a preamble of a frame is received via any of the multiple channels; and
a decoding module configured to decode a signal field of the frame in response to the preamble detection module having detected that the preamble of the frame has been received via a predetermined channel of the multiple channels, wherein the signal field follows the preamble.

10. The client station of claim 9, wherein in response to the preamble detection module having detected that the preamble of the frame has been received via the predetermined channel, the decoding module is configured to:
determine, based on having decoded the signal field, whether the frame is (i) a beacon or (ii) a probe response to a probe request; and
decode, in response to the frame being (i) the beacon or (ii) the response to the probe request, a remaining portion of the frame to determine whether to associate with one of the access points that transmitted the beacon or the probe response.

11. The client station of claim 9, wherein in response to the preamble detection module detecting that the preamble of the frame is received via one or more channels of the multiple channels different than the predetermined channel, the decoding module is configured to select one of the one or more channels as the predetermined channel.

12. The client station of claim 11, wherein the scanning module is configured to:
prior to selecting one of the one or more channels as the predetermined channel, scan the multiple channels by detecting whether one or more beacons are received from the one or more access points via one or more of the multiple channels; and
subsequent to selecting one of the one or more channels as the predetermined channel, scan the selected predetermined channel by (i) transmitting a probe request via the selected predetermined channel, and (ii) detecting whether a probe response is received from the one or more access points via the selected predetermined channel.

13. The client station of claim 2, wherein:
the frequency band is a 2.4 GHz band; and
the transceiver module is configured to transmit and receive data via a single 20 MHz channel in the 2.4 GHz band.

14. The client station of claim 2, wherein:
the frequency band is a 5 GHz band; and
the transceiver module is configured to transmit and receive data via a plurality of contiguous 20 MHz channels in the 5 GHz band.

15. A client station comprising:
a transceiver module configured to transmit and receive data via a frequency band, wherein the frequency band includes a plurality of channels;
a scanning module configured to
simultaneously scan multiple channels of the frequency band at the same time, and
determine whether one or more access points are available for association in one or more of the multiple channels; and
an association module configured to, in response to the scanning module determining that one or more access points are available for association, determine whether to associate with one of the one or more access points determined to be available for association;
wherein the scanning module includes:
a preamble detection module configured to detect whether a preamble of a frame is received via one of the multiple channels; and
a decoding module configured to, in response to the preamble detection module detecting that the preamble of the frame is received via one of the multiple channels,
decode the preamble or a signal field following the preamble, and
determine, based on the decoding of the preamble or the signal field, whether the preamble or the signal field includes an indication that the frame is (i) a beacon, (ii) a probe response, or (iii) transmitted by one of the access points;
wherein the decoding module is configured to stop decoding the frame in response to the decoding module having determined, based on the decoding of the preamble or the signal field, that the frame is neither the beacon nor the probe response; and
wherein the preamble detection module is configured to, in response to the decoding module having stopped the decoding of the frame, begin detecting whether the preamble of the frame is received via others of the multiple channels.

16. The client station of claim 15, wherein the decoding module is configured to decode, in response to the frame being (i) the beacon or (ii) the probe response, a remaining portion of the frame to determine whether to associate with one of the access points that transmitted the beacon or the probe response.

17. The client station of claim 15, wherein in response to the decoding module determining that the frame is transmitted by one of the access points, the scanning module is configured to send a probe request on the one of the multiple channels.

18. A method comprising:
transmitting and receiving data via a frequency band at a client station, wherein the frequency band includes a plurality of channels;
simultaneously scanning multiple channels of the frequency band at the same time;
determining whether one or more access points are available for association in one or more of the multiple channels;
in response to determining that one or more access points are available for association, determining whether to associate with one of the one or more access points determined to be available for association;
transmitting a probe request via each of the multiple channels; and
in response to having detected that multiple responses to the probe request have been received from more than one of the access points via more than one of the multiple channels,
attempting to decode a first response of the multiple responses, wherein the first response is received via a first channel of the multiple channels;
detecting, while decoding the first response received via the first channel, whether a preamble of a frame is received via a second channel of the multiple channels; and in response to having detected that the preamble of the frame is received via the second channel, retransmitting the probe request via the second channel.

19. The method of claim 18, further comprising:
determining whether one or more access points are available for association in one or more of the multiple channels by detecting whether one or more beacons are received from the one or more access points via one or more of the multiple channels; or
scanning the multiple channels and determining whether one or more access points are available for association in one or more of the multiple channels by (i) transmitting a probe request via each of the multiple channels, and (ii) detecting whether one or more responses to the probe request are received from the one or more access points via one or more of the multiple channels.

20. The method of claim 18, further comprising:
detecting whether a preamble of a frame is received via a first channel of the multiple channels;
attempting to decode a signal field of the frame in response to detecting that the preamble of the frame is received via the first channel of the multiple channels, wherein the signal field follows the preamble; and
(a) determining, based on decoding the signal field, whether the frame is (i) a beacon or (ii) a probe response; and decoding, in response to the frame being (i) the beacon or (ii) the probe response, a remaining portion of the frame to determine whether to associate with one of the access points that transmitted the beacon or the probe response; or
(b) stopping decoding the signal field in response to (i) being unable to decode the signal field, or (ii) determining, based on the decoding of the signal field, that the frame is neither the beacon nor the probe response; and in response to stopping the decoding of the signal field, beginning detecting whether a second preamble of a second frame is received via a second channel of the multiple channels.

21. The method of claim 18, further comprising:
detecting whether a preamble of a frame is received via a first channel of the multiple channels;
attempting to decode a signal field of the frame in response to detecting that the preamble of the frame is received via the first channel of the multiple channels, wherein the signal field follows the preamble; and
detecting, while attempting to decode the signal field of the frame received via the first channel of the multiple channels, whether a second preamble of a second frame is received via a second channel of the multiple channels.

22. The method of claim 21, wherein in response to detecting that the second preamble of the second frame is received via the second channel of the multiple channels, and subsequent to having decoded the signal field of the frame received via the first channel of the multiple channels, the method further comprising:
(a) (i) simultaneously scanning the multiple channels for a beacon interval to detect whether a beacon is received on the second channel of the multiple channels, or (ii) transmitting a probe request on the second channel of the multiple channels to elicit a probe response to the probe request; or
(b) (i) waiting until a probe response or a beacon is detected on the second channel of the multiple channels, (ii) transmitting a probe request on the second channel of the multiple channels, or (iii) transmitting a probe request on the multiple channels.

23. The method of claim 18, further comprising:
detecting whether a preamble of a frame is received via one of the multiple channels; and
in response to detecting that the preamble of the frame is received via one of the multiple channels,
decoding the preamble or a signal field following the preamble, and
determining, based on the decoding of the preamble or the signal field, whether the preamble or the signal field includes an indication that the frame is (i) a beacon, (ii) a probe response, or (iii) transmitted by one of the access points.

24. The method of claim 23, further comprising:
(a) decoding, in response to the frame being (i) the beacon or (ii) the probe response, a remaining portion of the frame to determine whether to associate with one of the access points that transmitted the beacon or the probe response;
(b) stopping decoding the frame in response to having determined, based on the decoding of the preamble or the signal field, that the frame is neither the beacon nor the probe response; and in response to having stopped the decoding of the frame, beginning detecting whether the preamble of the frame is received via others of the multiple channels; or
(c) in response to determining that the frame is transmitted by one of the access points, sending a probe request on the one of the multiple channels.

25. A method comprising:
transmitting and receiving data via a frequency band at a client station, wherein the frequency band includes a plurality of channels;
simultaneously scanning multiple channels of the frequency band at the same time;
determining whether one or more access points are available for association in one or more of the multiple channels;
in response to determining that one or more access points are available for association, determining whether to associate with one of the one or more access points determined to be available for association;
detecting whether a preamble of a frame is received via any of the multiple channels;
decoding a signal field of the frame in response to having detected that the preamble of the frame has been received via a predetermined channel of the multiple channels, wherein the signal field follows the preamble; and
in response to having detected that the preamble of the frame has been received via the predetermined channel,
(a) determining, based on having decoded the signal field, whether the frame is (i) a beacon or (ii) a probe response; and
(b) decoding, in response to the frame being (i) the beacon or (ii) the probe response, a remaining portion of the frame to determine whether to associate with one of the access points that transmitted the beacon or the probe response.

26. A method comprising:
transmitting and receiving data via a frequency band at a client station, wherein the frequency band includes a plurality of channels;
simultaneously scanning multiple channels of the frequency band at the same time;
determining whether one or more access points are available for association in one or more of the multiple channels;

in response to determining that one or more access points are available for association, determining whether to associate with one of the one or more access points determined to be available for association;

detecting whether a preamble of a frame is received via any of the multiple channels;

decoding a signal field of the frame in response to having detected that the preamble of the frame has been received via a predetermined channel of the multiple channels, wherein the signal field follows the preamble; and in response to detecting that the preamble of the frame is received via one or more channels of the multiple channels different than the predetermined channel, selecting one of the one or more channels as the predetermined channel;

prior to selecting one of the one or more channels as the predetermined channel, scanning the multiple channels by detecting whether one or more beacons are received from the one or more access points via one or more of the multiple channels; and subsequent to selecting one of the one or more channels as the predetermined channel, scanning the selected predetermined channel by (i) transmitting a probe request via the selected predetermined channel, and (ii) detecting whether a probe response is received from the one or more access points via the selected predetermined channel.

* * * * *